US006962498B2

(12) United States Patent
Kohen

(10) Patent No.: US 6,962,498 B2
(45) Date of Patent: Nov. 8, 2005

(54) REVOLVABLE PLUG AND SOCKET

(76) Inventor: Ran Kohen, 60 Ramot Yam Street, Herzelia 46851 (IL)

( * ) Notice: Subject to any disclaimer, the term of this patent is extended or adjusted under 35 U.S.C. 154(b) by 196 days.

(21) Appl. No.: 10/021,568

(22) Filed: Dec. 12, 2001

(65) Prior Publication Data
US 2003/0107891 A1 Jun. 12, 2003

(51) Int. Cl.[7] ............................................. H01R 39/00
(52) U.S. Cl. ........................ 439/21; 439/102; 439/953
(58) Field of Search ......................... 439/21–26, 537, 439/953, 348, 102

(56) References Cited

U.S. PATENT DOCUMENTS

| | | | | |
|---|---|---|---|---|
| 2,313,481 A | * | 3/1943 | Rendano | 439/21 |
| 2,673,966 A | * | 3/1954 | Larkin | 439/21 |
| 2,726,372 A | * | 12/1955 | Appleton | 439/21 |
| 2,863,037 A | * | 12/1958 | Johnstone | 219/432 |
| 3,118,713 A | * | 1/1964 | Ellis | 439/348 |
| 3,398,260 A | * | 8/1968 | Martens | |
| 3,521,216 A | * | 7/1970 | Tolegian | |
| 3,585,564 A | * | 6/1971 | Skjervoll | 439/21 |
| 3,798,584 A | * | 3/1974 | Person | 439/537 |
| 3,808,577 A | * | 4/1974 | Mathauser | |
| 4,335,927 A | | 6/1982 | Allen et al. | |
| 4,473,869 A | * | 9/1984 | De Widt | |
| 4,753,600 A | | 6/1988 | Williams | |
| 5,173,053 A | * | 12/1992 | Swanson et al. | 439/29 |
| 5,362,122 A | | 10/1994 | Speyer | |
| 5,551,882 A | | 9/1996 | Whiteman, Jr. et al. | |
| 6,068,490 A | | 5/2000 | Salzberg | |
| 6,241,559 B1 | * | 6/2001 | Taylor | 439/675 |

FOREIGN PATENT DOCUMENTS

| | | |
|---|---|---|
| IL | 126245 | 9/1998 |
| WO | WO 00/16442 | 3/2000 |

* cited by examiner

Primary Examiner—Neil Abrams
(74) Attorney, Agent, or Firm—Martin Fleit; Paul D. Bianco; Fleit Kain Gibbons Gutman Bongini & Bianco

(57) ABSTRACT

The invention relates to the support of light electric appliances such as light fittings and small fans.

The device according to the invention provides a plug and socket combination powering and supporting an appliance in a manner allowing the user to change its orientation. The combination is particularly useful where there is a frequent need to move light appliances from one location to another.

The combination comprises a fixable socket and a plug revolvable therein for conducting electric power and for mechanically supporting in a desired orientation an appliance receiving the power.

5 Claims, 4 Drawing Sheets

REVOLVABLE PLUG AND SOCKET

FIELD AND BACKGROUND OF THE INVENTION

The present invention relates to the support of light electric appliances such as light fittings and small fans.

More particularly, the invention provides a plug and socket combination powering and supporting an appliance in a manner allowing the user to change its orientation. The combination is particularly useful where there is a frequent need to move light appliances from one location to another.

In a previous disclosure, Israel Patent no. 126246, the present inventors described a socket and plug combination for conducting electric power and for mechanically supporting a light-weight appliance by means of said plug. Such appliance can be a light, camera, small TV receiver, TV camera, a small fan or the like. The present specification is a development of and an improvement on the earlier patent, which is hereby incorporated herein by reference.

In our earlier patent the socket has prong-receiving receptacles similar to those found on conventional sockets. Consequently, after the appliance was plugged into the socket, which itself was rigidly attached to a wall or ceiling, the orientation of the appliance attached to the plug could no longer be changed. Where the item being installed is substantially symmetrical, for example a common incandescent filament lamp mounted in a cylindrical lamp socket, such restriction is meaningless. There are however many lighting fixtures with reflectors which need to be oriented in a certain direction, or may be expected to serve a user in two proximate but different locations. With regard to a non-oscillating fan, or a small television camera or receiver, directional orientation is most important for effective use thereof.

In U.S. Pat. No. 4,753,600 Williams discloses an electrical connector for use with hand tools joined to drop cords. The connector is placed in the cord and allows unlimited rotation without twisting the cable. The connector is not attachable to a building surface and can not support any load.

The rotatable electric connector proposed by Salzberg in U.S. Pat. No. 6,068,490 is arranged to be plugged into a wall socket but not to support any load therefrom apart for its own weight. A revolvable portion carries a cable terminated by an electric socket.

OBJECTS OF THE INVENTION

It is therefore one of the objects of the present invention to obviate the limitations of prior art electrical plugs and sockets and to provide an assembly which is configured to both support and power a revolvable load, i.e. an electric appliance.

It is a further object of the present invention to reduce cost by providing an embodiment for single phase supply line requiring only two slip rings in place of the three slip rings in prior-art revolvable plugs.

SUMMARY OF THE INVENTION

The present invention achieves the above objects by providing a combination of a fixable socket and a plug revolvable therein for conducting electric power and for mechanically supporting in a desired orientation an appliance receiving said power, said combination comprising:

a) a socket rigidly attachable to a wall or ceiling, said socket comprising a non-conductive body including at least two spaced-apart hollow arcuate conducting receptacles insulated from each other and having a common center of curvature and being connectable to an electric power supply, said socket rigidly supporting a first structural element of a mechanical connection located at said radius of curvature;

b) a plug also comprising a non-conductive body, rigidly attachable to, and configured to mechanically support an appliance from a first face, said plug supporting from a second face at least two projecting conducting prongs insulated from each other and engagable with said at least two arcuate receptacles respectively and connectable to conductors for feeding electric power to said appliance, said plug also including a second structural element engagable to said first structural element of said mechanical connection and allowing said plug to revolve at least part of a revolution about said center of curvature; and c) releasable latching means attached to said combination, providing when engaged a retention force between said socket and said plug to prevent disengagement and to support said appliance.

In a preferred embodiment of the present invention there is provided a socket and plug combination wherein said first structural element comprises an aperture and said second structural element comprises a post-like male member engagable with said aperture.

In a most preferred embodiment of the present invention there is provided socket and plug combination wherein both parts of said mechanical connection are conductive and are arranged to be wired for use as an earth connection.

Yet further embodiments of the invention will be described hereinafter.

It will thus be realized that the novel connector of the present invention serves to allow fast installation of small electrical appliances. Unlike the industrial bus-bar, the present invention maintains a standard of appearance appropriate to residential areas. The ability of varying the orientation of the supported appliance is additional to the facility of fast exchange for another appliance fitted with a plug according to the present invention.

The present specification does not describe a locking device for retaining the plug in a desired orientation, which is a desirable addition. The prior art however describes many types of locking, braking, detent or location retention device, and an appropriate locking device can easily be added to the plug-socket combination of the present invention to retain the plug in any desired position.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings.

DETAILED DESCRIPTION OF THE PRESENT INVENTION

Figure 1:
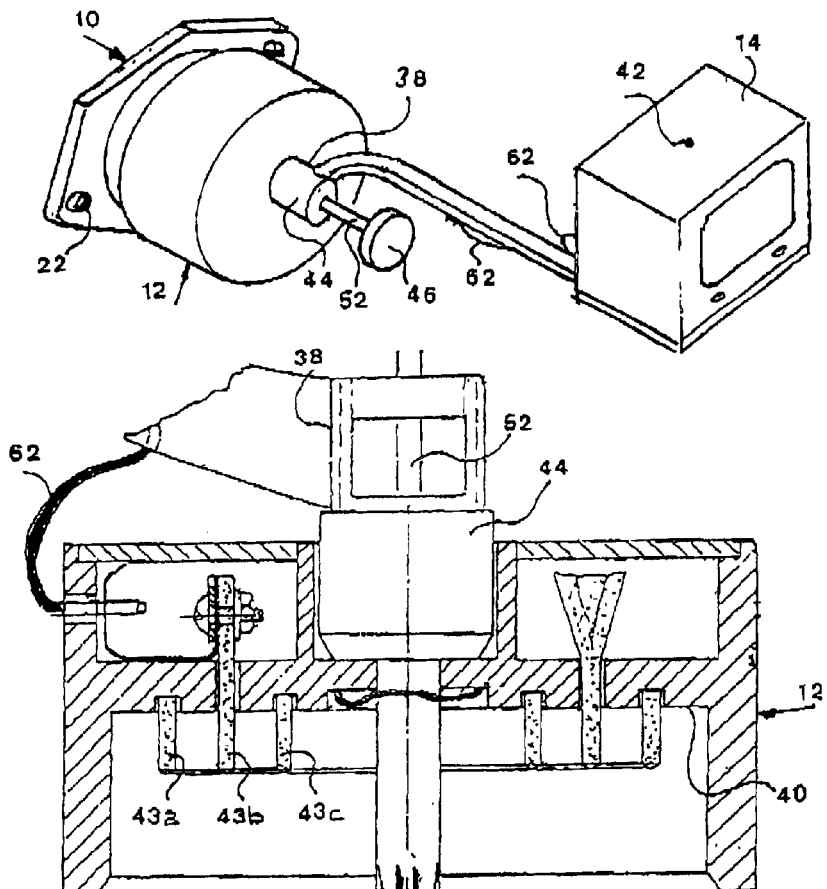
FIG. 1 is a non-detailed perspective view of a preferred embodiment of the socket and plug combination attached to a wall, according to the invention.
Figure 2:
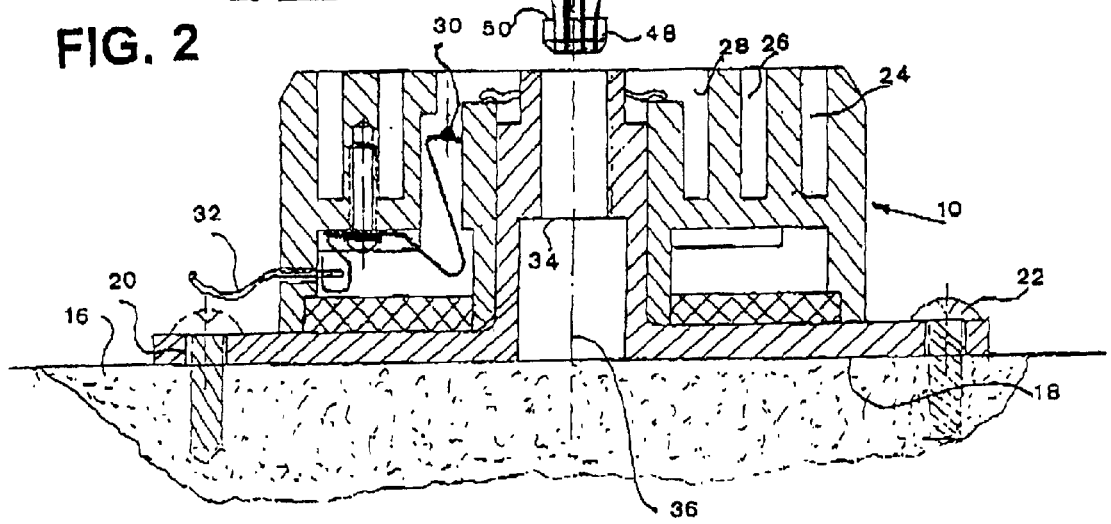
FIG. 2 is a sectional elevational view of the same embodiment showing the plug before engagement with socket.
Figure 4:
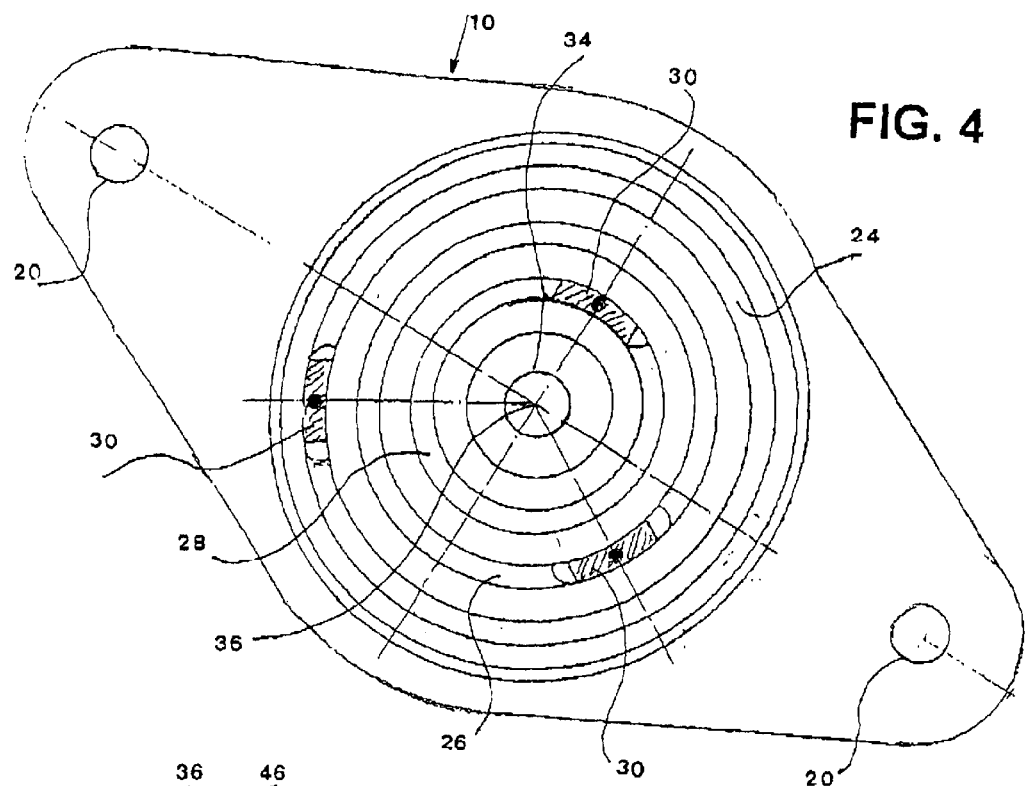
FIG. 4 is a plan view of the socket seen in FIGS. 1 and 2.

There is seen in FIGS. 1, 2 and 4 a combination of a fixable socket 10 and a plug 12. The plug 12 is revolvable in the socket 10, and receives electric power therefrom. The combination 10+12 serves also for mechanically supporting in a desired orientation a light appliance 14, in the present example a miniature television receiver, receiving said power.

The socket 10 is shown in the present figure attached to a wall 16, seen in FIG. 2. The socket 10 has a flat base 18 and apertures 20 to allow the passage of screws 22. The socket 10 has a non-conductive body made of a plastic. Three spaced-apart hollow arcuate conducting receptacles 24, 26, 28, seen most clearly in FIG. 4, are insulated from each other and have a common center of curvature 36. All three receptacles 24, 26, 28 comprise molded recesses containing conductive inserts 30, one of which is seen in FIG. 2, which can be permanently connected by wires 32 to an electric power supply.

The socket 10 rigidly supports a first structural element 34, comprising a cylindrical aperture, of a mechanical connection located at the center of the radius of curvature 36 of the conducting receptacles 24, 26, 28.

A plug 12 also made of a plastic is configured to match the socket 10. The plug body is made of a plastic, and is somewhat larger than conventional plugs to enable the plug to rigidly support an appliance from a first face 38. The plug 10 has a second face 40 for mechanically supporting the conductive prong rings 43*a,b,c*. The appliance 14 weight is about 0.5 to 5 kg, depending on the support configuration in the case of wall attachment. The shorter the distance between the wall 16 and the appliance center of gravity 42, the higher the load which can be supported.

Three projecting conducting prong rings insulated from each other are positioned to be engagable with the three arcuate receptacles 24, 26, 28 of the socket 10, respectively. The prong rings are connected to conductors 62 for feeding electric power to the appliance 14.

The plug 12 also supports a second structural element 44, engagable to the first structural element 34 of the mechanical connection and allowing the plug 12 to revolve at least part of a revolution about the center of curvature 36.

Preferably and as seen in the figure, the first structural element 34 comprises an aperture and the second structural element 44 comprises a post-like male member engagable with the aperture 34. The reverse order, that is where the socket 10 carries the male member, is also feasible.

Releasable latching means 46 retain the plug 12 in the socket 10, by providing a retention force between the socket and the plug to prevent disengagement and to support the appliance. In the present embodiment latching means 46 comprises a split expandable post end 48 with a shoulder 50. An internal shouldered push rod 52 is axially moved to expand the split end 48, enabling the shoulder 50 to abut the aperture of the first structural element 44.

Latching means 48 are sized to engage the first structural element 44 with sufficient retention force to support a two kg appliance 14 in a ceiling socket during an earthquake of a severity not causing structural damage to the building in which the combination is installed. Users will not expect an appliance to continue to be supported following a severe earthquake, which damages the building structure itself.

With reference to the rest of the figures, similar reference numerals have been used to identify similar parts.

Figure 3:
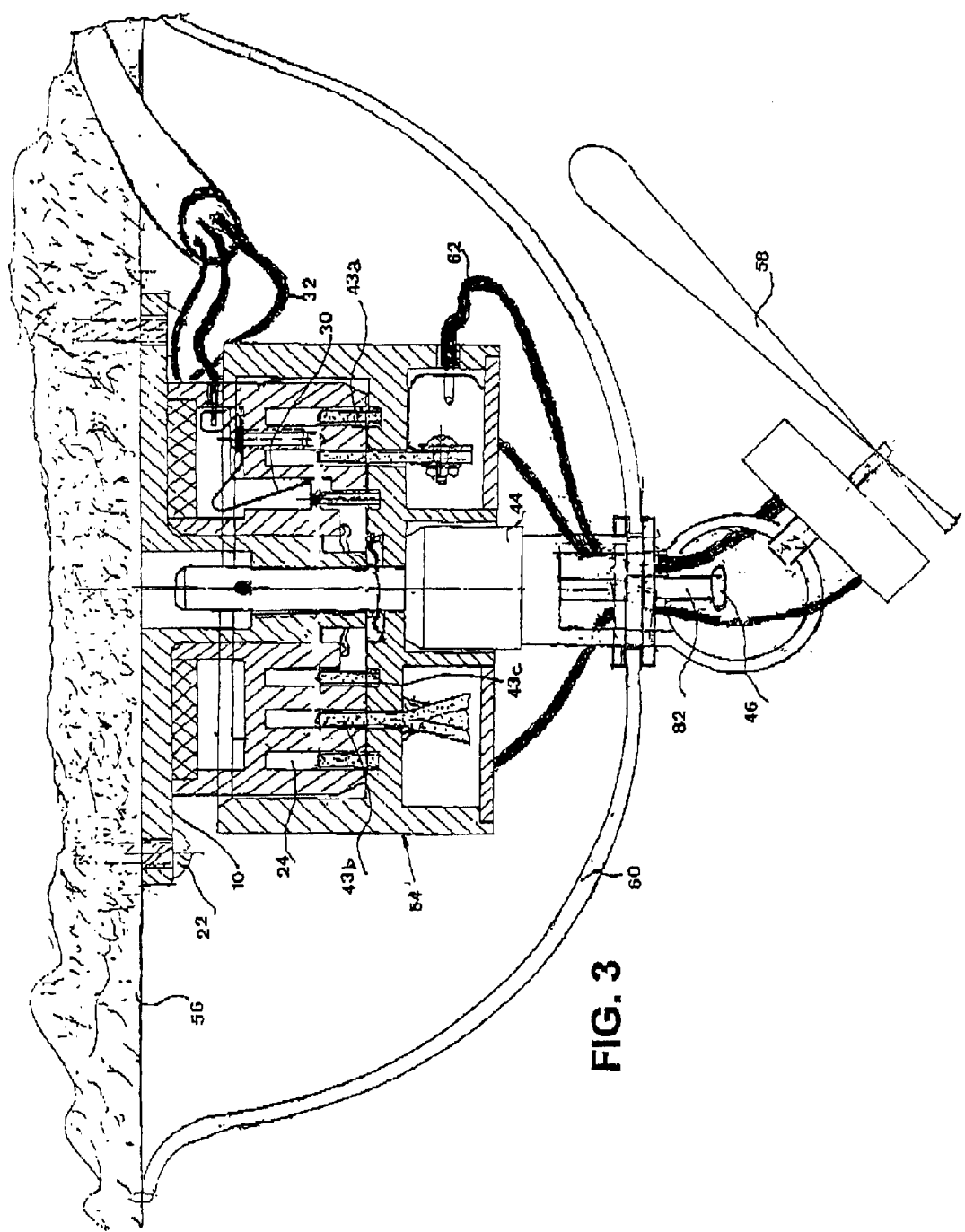
FIG. 3 is a sectional elevational view of an embodiment attached to a ceiling and supporting a fan.

FIG. 3 shows an embodiment of an interconnected socket 10 and plug 54. The socket 10 is seen attached to a ceiling 56. The plug 54 supports a fan 58, which can be directed to face any desired direction by revolving the plug 54 in its socket 10. The bowl-shaped cover 60 is added to improve appearance and to prevent users making contact with electric wires 32, 62. The inner assembly is similar to the plug 12 and socket 10 shown not yet interconnected in FIG. 2.

Figure 5:
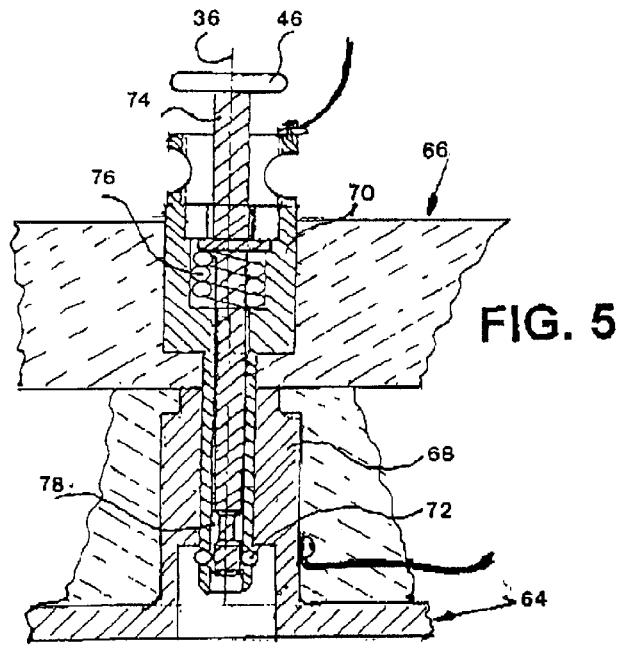
FIG. 5 is a detail sectional elevation of a second embodiment of the release mechanism.

Referring now to FIG. 5, there is depicted a detail of a socket 64 and plug 66 combination wherein both parts 68, 70 of the mechanical connection are conductive and are arranged to be wired for use as an earth connection. It will be appreciated that the earth plug prong ring, 43*b* in FIG. 2, is eliminated from the plug, an arcuate recess 26 in FIG. 2 is eliminated from the socket, and both plug and socket can be made smaller.

The socket 64 rigidly supports a first structural element 68 of a mechanical connection is located at the radius of curvature 36. Element 68 is a female metal component molded into the plastic body 66. Due to the high stress on element 68, a metal construction is in any case an advantage, thus opening the option of utilizing the mechanical connection as an earth connector.

The retention mechanism in the present embodiment comprises a plurality of hard captive balls 72 which are shown in the figure at their outer position. The balls 72 retain the plug 66 in the socket 64, as the post 70 can not be withdrawn through the element 68 while the balls 72 project outwards. Pushing the rod 74 inwards, against the compression spring 76 allows the balls 72 to retract into a recess 78 to allow withdrawal of the plug 66.

Figure 6:
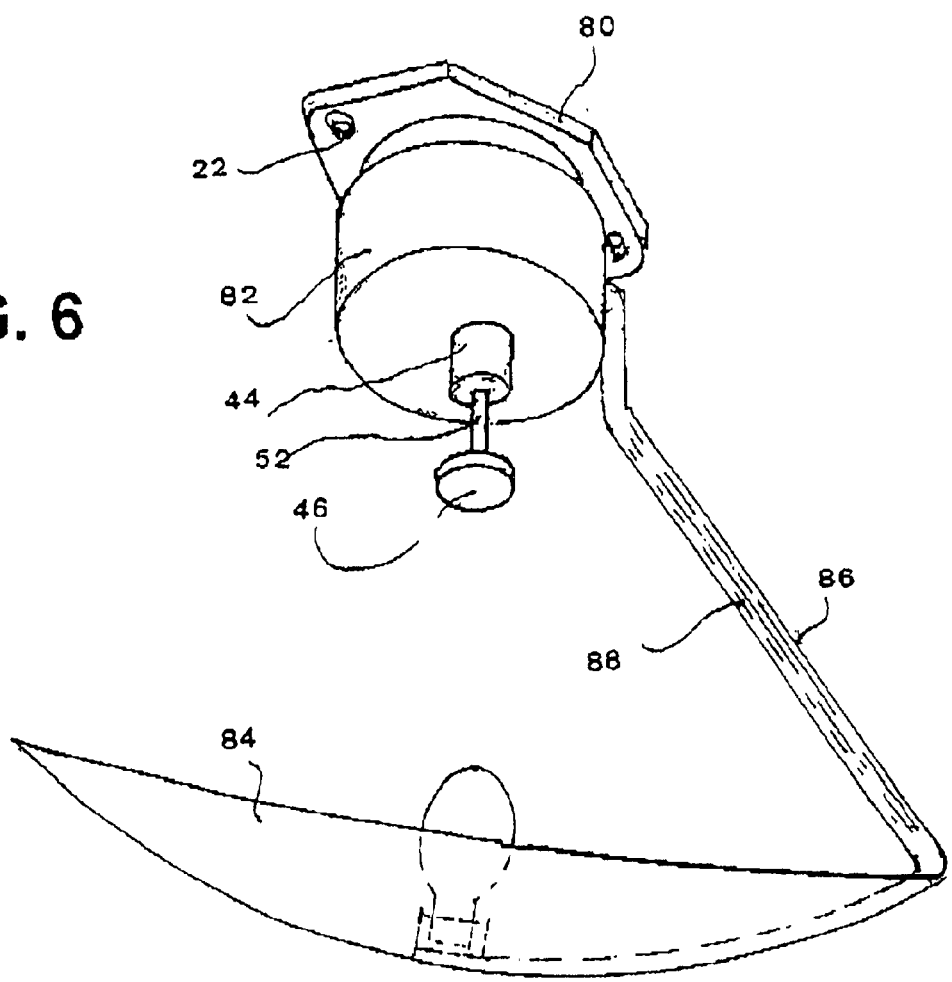
FIG. 6 is a perspective view of the plug-socket combination supporting a lighting fixture.

FIG. 6 shows a socket 80 and plug 82 combination similar to that seen in FIG. 1. The appliance being powered and supported is an electric light fitting 84. The hollow support arm 86 carrying cables 88 is attached to the side of the plug 82. The light fitting 84 can be quickly installed, adjusted to radiate in a desired direction, and quickly removed when not needed—without the aid of tools.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. A combination of a fixable socket and a plug revolvable therein for conducting electric power and for mechanically supporting in a desired orientation an appliance receiving said power, said combination comprising:

a) a socket rigidly attachable to a wall or ceiling, said socket comprising a non-conductive body including at least two spaced-apart hollow arcuate conducting receptacles insulated from each other and having a common center of curvature and being connectable to an electric power supply, said socket rigidly supporting a first structural element of a mechanical connection located at said radius of curvature;

b) a plug also comprising a non-conductive body, rigidly attachable to, and configured to mechanically support an appliance from a first face, said plug supporting from a second face at least two projecting conducting prong elements insulated from each other and engagable with said at least two arcuate receptacles respectively and connectable to conductors for feeding electric power to said appliance, said plug also including a second structural element engagable to said first structural element of said mechanical connection and allowing said plug to revolve at least part of a revolution about said center of curvature; and c) releasable latching means attached to said combination, providing when engaged a retention force between said socket and said plug to prevent disengagement and to support said appliance;

said first structural element of a mechanical connection comprising an aperture and said second structural element of a mechanical connection comprising a post-like male member engagable with said aperture; and wherein said first and second structural elements of said mechanical connection are conductive and are arranged to be wired for use as an earth connection.

2. The combination of claim 1, wherein said latching means include a captive ball detent.

3. A connection apparatus, comprising:

a fixable socket having two or more spaced apart hollow concentric receptacles, said receptacles being insulated from each other and having respective recesses including conductive inserts, said conductive inserts being connectable to an electric power supply; and a plug adapted to revolve in said socket, said plug having two or more conductive prong rings positioned to be engagable with said concentric receptacles, said prong rings adapted to conduct electric current to an appliance associated with said plug;

a releasable latching mechanism providing a retention force between said socket and said plug, to prevent unwanted disengagement of said plug from said socket, wherein said latching mechanism includes a captive ball detent.

4. The apparatus of claim 3, comprising a first structural element of a mechanical connection, supported rigidly by said socket, and a second structural element of said mechanical connection, said second structural element being engageable to said first structural element and being adapted to revolve around said fixable socket.

5. The apparatus of claim 4, wherein said first structural element and said second structural element of said mechanical connection are conductive of electric current, and are used as an earth connection.

\* \* \* \* \*